US009571775B1

(12) United States Patent
Zuo et al.

(10) Patent No.: US 9,571,775 B1
(45) Date of Patent: Feb. 14, 2017

(54) IMAGE SENSOR POWER SUPPLY REJECTION RATIO IMPROVEMENT THROUGH RAMP GENERATOR IN CONTINUOUS TIME READOUT CIRCUITRY

(71) Applicant: OMNIVISION TECHNOLOGIES, INC., Santa Clara, CA (US)

(72) Inventors: Liang Zuo, San Jose, CA (US); Zhihao Xu, Sunnyvale, CA (US); Bi Yuan, San Jose, CA (US); Liping Deng, Cupertino, CA (US); Yuxin Wang, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/942,622

(22) Filed: Nov. 16, 2015

(51) Int. Cl.
*H04N 5/335* (2011.01)
*H04N 3/14* (2006.01)
*H04N 5/378* (2011.01)
*H04N 5/369* (2011.01)
*H04N 5/376* (2011.01)
*H04N 5/225* (2006.01)

(52) U.S. Cl.
CPC ............ *H04N 5/378* (2013.01); *H04N 5/2253* (2013.01); *H04N 5/3698* (2013.01); *H04N 5/3765* (2013.01)

(58) Field of Classification Search
CPC .................................................... H04N 5/3745
USPC ........................ 348/294, 300, 301; 250/208.1
See application file for complete search history.

(56) References Cited

U.S. PATENT DOCUMENTS

| 9,148,596 | B1 | 9/2015 | Sun et al. | |
|---|---|---|---|---|
| 2012/0038343 | A1* | 2/2012 | Takagi | G05F 1/561 323/299 |
| 2013/0075608 | A1* | 3/2013 | Han | G01T 1/247 250/336.1 |
| 2015/0311914 | A1* | 10/2015 | Chae | H03M 3/484 250/208.1 |

OTHER PUBLICATIONS

U.S. Appl. No. 14/685,151, filed Apr. 13, 2015, Bi Yuan et al.

* cited by examiner

*Primary Examiner* — Anthony J Daniels
(74) *Attorney, Agent, or Firm* — Blakely Sokoloff Taylor & Zafman LLP

(57) ABSTRACT

A ramp generator for use in readout circuitry includes an integrator coupled to receive a ramp generator input reference signal to generate a reference ramp signal coupled to be received by an analog to digital converter. A power supply compensation circuit that is coupled to generate the ramp generator input reference signal includes a delay circuit including a variable resistor and a filter capacitor coupled to receive a power supply signal. The variable resistor is tuned to match a delay ripple from the power supply to a bitline output. A capacitive voltage divider is coupled to the delay circuit to generate the ramp generator input reference signal. The capacitive voltage divider includes a first variable capacitor coupled to a second variable capacitor that are tuned to provide a capacitance ratio that matches a coupling ratio from the power supply to the bitline output.

13 Claims, 3 Drawing Sheets

IMAGE SENSOR POWER SUPPLY REJECTION RATIO IMPROVEMENT THROUGH RAMP GENERATOR IN CONTINUOUS TIME READOUT CIRCUITRY

BACKGROUND INFORMATION

Field of the Disclosure

The present invention relates generally to image sensors. More specifically, examples of the present invention are related to circuits that readout image data from image sensor pixel cells.

Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and lower power consumption have encouraged the further miniaturization and integration of CMOS image sensors.

In a conventional CMOS active pixel sensor, image charge is transferred from a photosensitive device (e.g., a photo diode) and is converted to a voltage signal inside the pixel cell on a floating diffusion node. In conventional CMOS image sensors, an amplifier such as a source follower circuit is used in the pixel cells to amplify the signal on the floating diffusion node to output the image data to the bit lines, which are read by the column readout circuitry. Limited by the design and layout constraints of pixel cells, the source follower circuits can suffer from an unsatisfactory power supply rejection ratio, such as −20 dB. An unsatisfactory power supply rejection ratio can present many challenges, including noise from power supplies that can enter into the output signal path. The source follower circuits and bitline circuits can suffer from noise coupled form power supplies such as AVDD (VDD used in a pixel cell), HVDD (positive voltage pump), and NVDD (negative voltage pump). Furthermore, the coupling ratio from each power supply to readout signal path, and the ripple of power supplies can cause unwanted horizontal ripple in the captured images.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
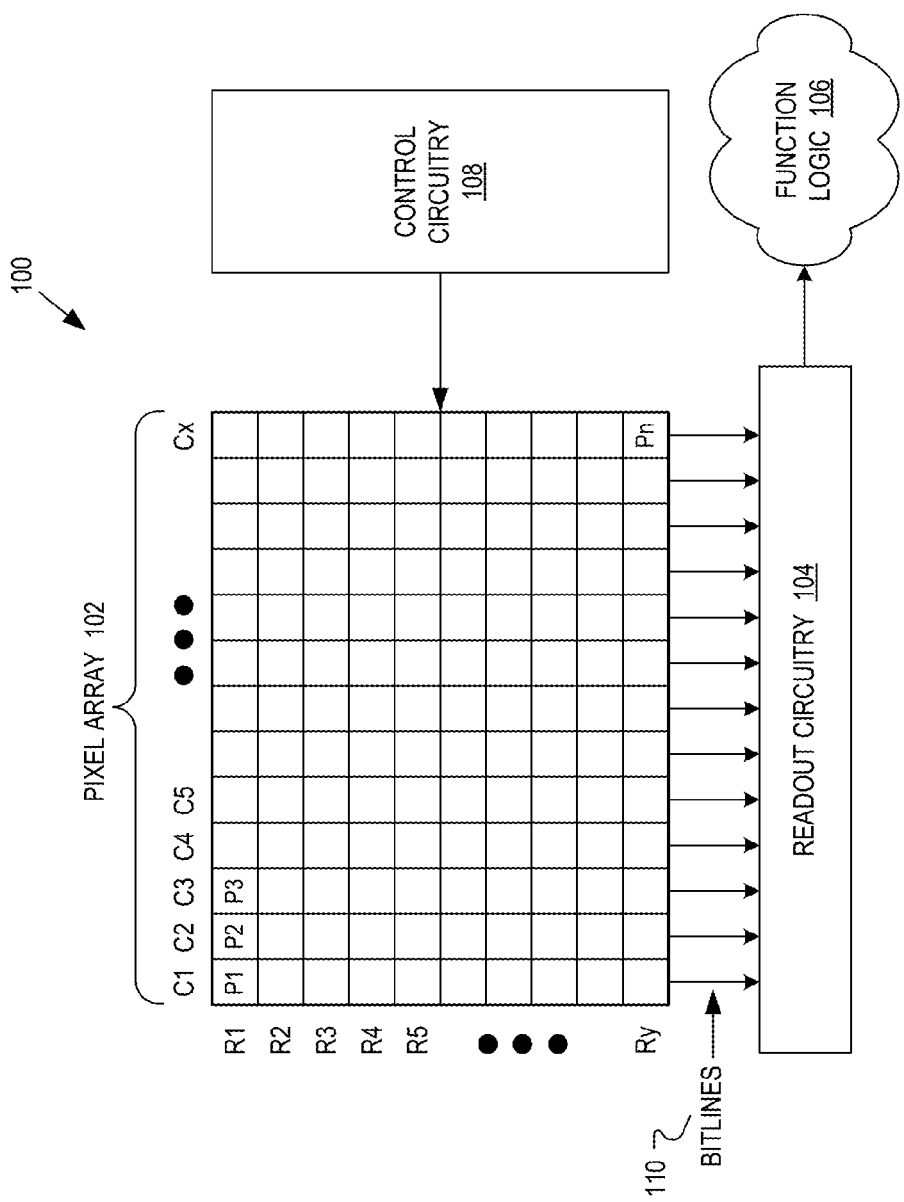
FIG. 1 is a is a block diagram illustrating an example imaging system including a pixel array having pixel cells and readout circuitry to improve the power supply rejection ratio on chip in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, examples in accordance with the teaching of the present invention describe a ramp generator that is adapted for use in readout circuitry of an image sensor. In various examples, the ramp generator is implemented as a double-ramp generator and includes a power supply compensation circuit. An analog to digital converter is coupled to receive analog image data from a pixel array of an image sensor, and a ramp reference signal from the ramp generator. The analog to digital converter is coupled to receive the analog image data from a bitline output of a pixel cell of an image sensor and converts the analog image data to a digital image data signal. The ramp generator includes an integrator circuit to generate the ramp reference signal. The ramp generator includes a power supply compensation circuit that is coupled to generate a ramp generator input reference signal that is coupled to be received by an input of the integrator circuit.

The power supply compensation circuit includes a delay circuit including a variable resistor coupled to receive a power supply signal. The power supply signal is representative of a power supply that coupled to supply power to pixel cells of the image sensor. The delay circuit also includes a filter capacitor coupled to the variable resistor. The variable resistor is coupled to be tuned to match a delay ripple from the power supply to the bitline output of the pixel cell with a delay ripple from the power supply signal to the ramp generator input reference signal. A capacitive voltage divider is coupled to the delay circuit to generate the ramp generator input reference signal. The capacitive voltage divider includes a first variable capacitor coupled to a second variable capacitor. The first variable capacitor and the second variable capacitor are coupled to be tuned to provide a capacitance ratio of the capacitive voltage divider that matches a coupling ratio from the power supply to the bitline output the pixel cell. In various examples, the integrator circuit also includes a second input coupled to receive a constant input signal.

During a readout from the image sensor, the power supply compensation circuit tracks the behavior of bitline output from the image sensor continuously, so that the ratio and the delay of the power supply ripple to the bitline output matches the delay from power supply to the reference ramp signal that is coupled to be received by an analog to digital converter. Therefore, any power supply variation on two separate paths will be canceled out at the input of the analog to digital converter in accordance with the teachings of the present invention.

To illustrate, FIG. 1 is a block diagram illustrating an example imaging system including an image sensor implemented with a pixel array having pixel cells and readout circuitry to improve the power supply rejection ratio in accordance with the teachings of the present invention. As shown, FIG. 1 depicts one example of an image sensing system 100 that includes readout circuitry 104 with a ramp generator including a ramp generator with a power supply compensation circuit to improve the power supply rejection ratio in bitline outputs in accordance with the teachings of the present invention. As shown in the depicted example, imaging system 100 includes pixel array 102 coupled to control circuitry 108, and readout circuitry 104, which is coupled to function logic 106.

In one example, pixel array 102 is a two-dimensional (2D) array of imaging sensors or pixel cells (e.g., pixel cells P1, P2, P3, . . . , Pn). In one example, each pixel cell is a CMOS imaging pixel. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell has accumulated its image data or image charge, the image data coupled to be received by readout circuitry 104 through column bitlines 110 and then transferred to function logic 106. In various examples, readout circuitry 104 may also include additional amplification circuitry, sampling circuitry, additional analog-to-digital (ADC) conversion circuitry, or otherwise. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column bitlines 110 (illustrated) or may readout the image data using a variety of other techniques (not illustrated), such as a serial readout or a full parallel readout of all pixels simultaneously.

In one example, control circuitry 108 is coupled to pixel array 102 to control operational characteristics of pixel array 102. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
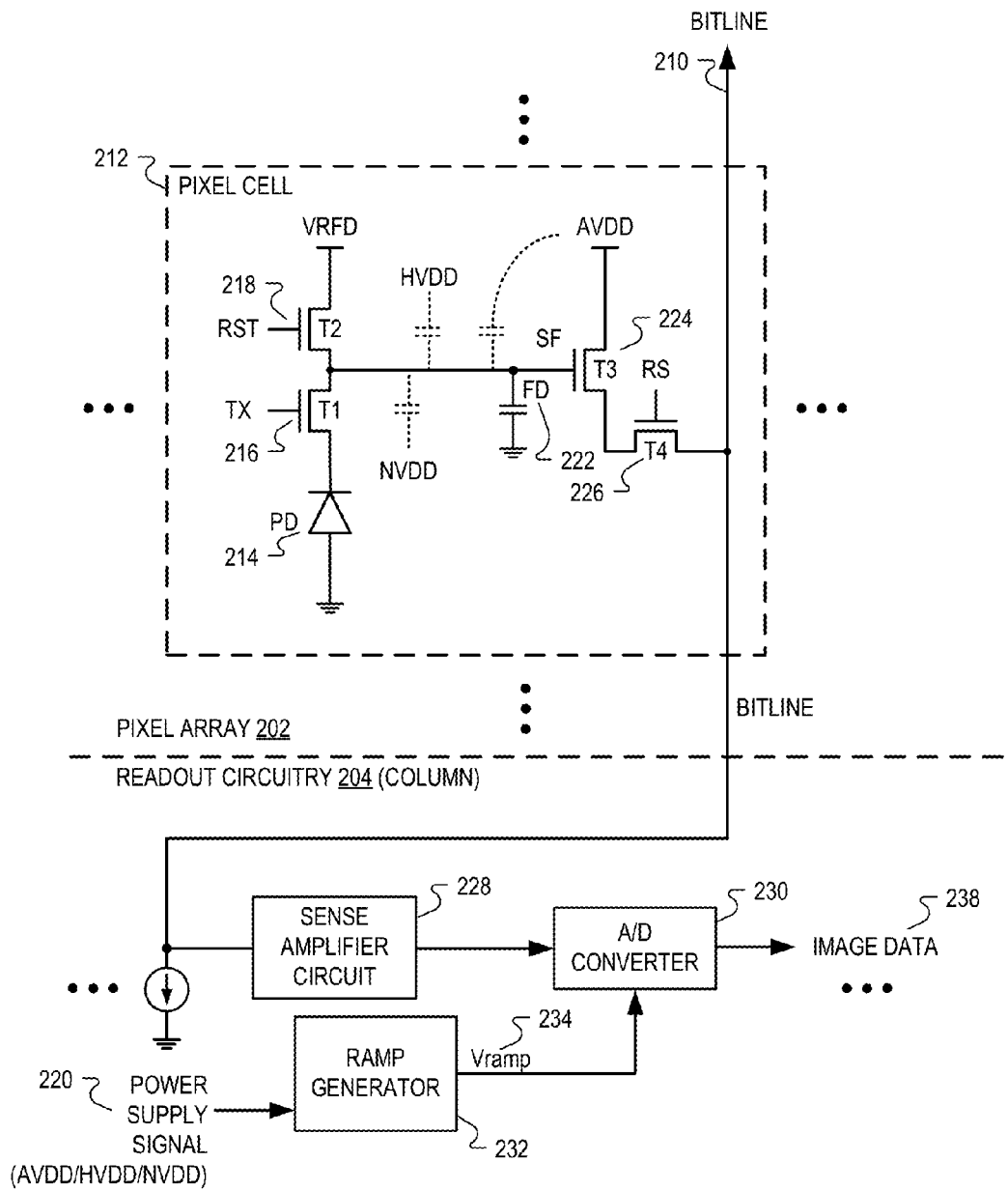
FIG. 2 is a schematic illustrating one example of a pixel cell coupled to readout circuitry including a ramp generator with a power supply compensation circuit coupled to an analog to digital converter that improves the power supply rejection ratio of the pixel cell in accordance with the teachings of the present invention.

FIG. 2 is a schematic illustrating one example of a pixel cell coupled to readout circuitry including a ramp generator with a power supply compensation circuit to improve the power supply rejection ratio in bitline outputs coupled to an analog to digital converter in accordance with the teachings of the present invention. In particular, FIG. 2 shows a schematic of one example of a pixel cell 212 of a pixel array 202 coupled to a column of readout circuitry 204 having a readout architecture that compensates for ripples or variations in the power supply of the pixel cells 212 of pixel array 202 in accordance with the teachings of the present invention. It is noted that the pixel cell 212, pixel array 202, and readout circuitry 204 of FIG. 2 may be examples pixel cells P1, P2, . . . Pn, pixel array 102, and readout circuitry 104 of FIG. 1, and that similarly named and numbered elements referenced below are therefore coupled and function similar to as described above.

In the example depicted in FIG. 2, pixel cell 212 is illustrated as being a four-transistor (4T) pixel cell. It is appreciated that pixel cell 212 is one possible example of pixel circuitry architecture for implementing each pixel cell within pixel array 202. However, it should be appreciated that other examples in accordance with the teachings of the present invention are not necessarily limited to 4T pixel architectures. One having ordinary skill in the art having the benefit of the present disclosure will understand that the present teachings are also applicable to 3T designs, 5T designs, and various other pixel cell architectures in accordance with the teachings of the present invention.

In the example depicted in FIG. 2, pixel cell 212 includes a photosensitive element, which may also be referred to as a photodiode (PD) 214 to accumulate image charge, a transfer transistor T1 216, a reset transistor T2 218, a floating diffusion (FD) node 222, an amplifier transistor, which is illustrated as a source-follower (SF) transistor T3 224, and a row select transistor T4 226. During operation, transfer transistor T1 216 receives a transfer signal TX, which selectively transfers the image charge accumulated in photosensitive element PD 214 to floating diffusion FD node 222.

As shown in the illustrated example, reset transistor T2 218 is coupled between a power supply voltage (VRFD) and the floating diffusion node FD 222 to reset levels in the pixel cell 212 (e.g., discharge or charge the floating diffusion node FD 222 and the photosensitive element PD 214 to a preset voltage) in response to a reset signal RST. The floating diffusion node FD 222 is coupled to control the gate of amplifier transistor SF T3 224. Furthermore, amplifier transistor SF T3 224 is coupled between a power supply voltage (AVDD) and row select transistor RS T4 226. Amplifier transistor SF T3 224 operates as a source-follower amplifier providing a high impedance connection to the floating diffusion node FD 222. In addition, the example depicted in FIG. 2 also illustrates various parasitic capacitances that may exist along the image data signal output path. The various parasitic capacitances are coupled to various power supply voltages, including for example a positive voltage pump (HVDD) and a negative voltage pump (NVDD). Row select transistor RS T4 226 selectively couples the image data output of pixel cell 212 to the readout column bitline output 210 in response to a row select signal RS. In the illustrated example, bitline output 210 is coupled to selectively readout image data from a column of the pixel array 202.

The example depicted in FIG. 2 also illustrates a column of readout circuitry 204, which includes a sense amplifier circuit 228 that is coupled to bitline output 210 to readout image data from pixel cell 212 of pixel array 202. In one example, the image data that is sensed with sense amplifier circuit 228 may be sampled, and then output to an analog to digital converter 230, which converts the sensed analog image data received from sense amplifier circuit 228.

In one example, the analog to digital converter 230 is also coupled to receive a reference ramp signal Vramp 234 from a ramp generator 232. During the conversion process of analog to digital converter 230, the reference ramp signal Vramp 234 decreases (or increases) from a starting value. In one example, analog to digital converter 230 outputs a digital image data 238 signal after the conversion process is complete in response to the reference ramp signal Vramp 234 signal and the analog image data signal received from sense amplifier circuit 228. In one example, the digital image data 238 may then be received by function logic 106, as shown for example in FIG. 1.

As will be discussed in greater detail below, in one example, ramp generator 232 is coupled to receive a power supply signal 220, which is representative of the power supply used to provide power (e.g., AVDD/HVDD/NVDD) to the pixel cells 212 of the image sensor. A power supply compensation circuit included within ramp generator 232 is coupled to continuously track the power supply to compensate for variations or ripples that occur in the power supply. Ramp generator 232 may compensate for the variations or ripples by adjusting a starting value of the reference ramp signal Vramp 234 that is coupled to be received by the analog to digital converter 230 to improve power supply rejection ratio in accordance with the teachings of the present invention. As a result, any power supply variation in the two separate paths (from bitline output 210 and from ramp generator 232) will be canceled out at the input of analog to digital converter 230 in accordance with the teachings of the present invention.

Figure 3:
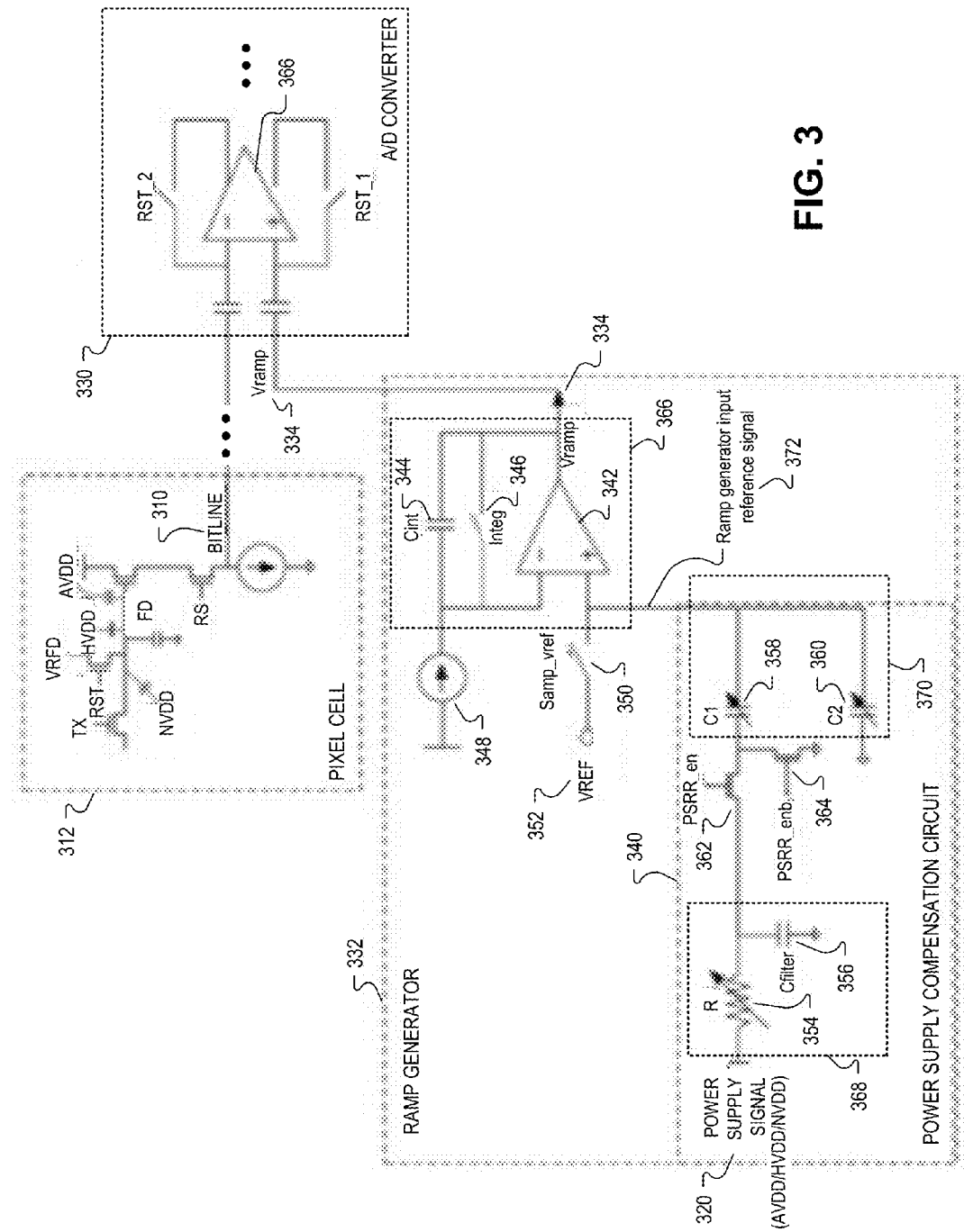
FIG. 3 is a schematic illustrating one example of a ramp generator included in readout circuitry of an image sensing system with a power supply compensation circuit that improves the power supply rejection ratio in accordance with the teachings of the present invention.

To illustrate, FIG. 3 is a schematic illustrating one example of a ramp generator 332 included in readout circuitry of an image sensing system that improves the power supply rejection ratio in bitline outputs in accordance with the teachings of the present invention. It is noted that the pixel cell 312, the analog to digital converter 330, and the ramp generator 332 of FIG. 3 may be an examples of the pixel cell 212, the analog to digital converter 230, and the ramp generator 232 of FIG. 2, and that similarly named and numbered elements referenced below are therefore coupled and function similar to as described above.

As shown in the example depicted in FIG. 3, an input portion of analog to digital converter 330 includes a comparator 336 having a first input capacitively coupled to receive image data from bitline output 310 from pixel circuit 312. A second input of comparator 336 is capacitively coupled to receive the reference ramp signal Vramp 334 from ramp generator 332. In one example, reset switches RST_1 and RST_2 are coupled to selectively reset the first and second inputs of comparator 336 as shown.

As shown in the illustrated example, ramp generator 332 is coupled to generate reference ramp signal Vramp 334. In one example, ramp generator 332 is implemented as a double-ramp generator and includes an integrator circuit 366 having an integrator-coupled operational amplifier 342 with a first input, which is shown as a non-inverting input (+), coupled to receive a ramp generator input reference signal 372 from a power supply compensation circuit 340. In the example, the non-inverting input of operational amplifier 342 is also coupled to selectively sample a reference signal VREF 352 through a Samp_ref reference sampling switch 350. In one example, the reference signal VREF 352 may be 2 volts.

Operational amplifier 342 of integrator circuit 366 also includes a second input, which is illustrated as an inverting input (−), coupled to receive a constant input signal. In one example, the constant input signal is coupled to be received from a constant current source 348. The output of operational amplifier 342 is coupled to generate reference ramp signal Vramp 334 coupled to be received by analog to digital converter 330. The inverting input of the operational amplifier 342 is also capacitively coupled through capacitor Cint 344 to the output of operational amplifier 342. In addition, an Integ equalizing switch 346 is coupled between the inverting input and the output of the operational amplifier 342. In one example, the Integ equalizing switch 346 is adapted to be ON or closed to equalize the inverting input and the output of the operational amplifier 342. In one example, the Integ equalization switch 346 is switched OFF to begin the integration process, or begin a next ramp of reference ramp signal Vramp 334.

As shown in the illustrated example, the power supply compensation circuit 340 is located inside ramp generator 332. Power supply compensation circuit 340 is coupled to generate the ramp generator input reference signal 372, which is coupled to be received by the non-inverting input of operational amplifier 342 of integrator circuit 366. In the example depicted in FIG. 3, power supply compensation circuit 340 includes a delay circuit 368 including a variable resistor R 354 coupled to receive a power supply signal 320, which is representative of the power supply used to provide power (e.g., AVDD/HVDD/NVDD) to the pixel cells 312 of the image sensor. In the example, delay circuit 368 also includes a filter capacitor Cfilter 356 coupled to the variable resistor R 354. In one example, the variable resistor R 354 is coupled to be tuned to match a delay ripple from the power supply (AVDD/HVDD/NVDD) to the bitline output 310 of the pixel cell with a delay ripple from the power supply signal 320 to the ramp generator input reference signal Vramp 334 in accordance with the teachings of the present invention.

The example depicted in FIG. 3 also illustrates that power supply compensation circuit 340 further includes a capacitive voltage divider 370 coupled to the delay circuit 368 to generate the ramp generator input reference signal 372. In the example, the capacitive voltage divider 370 includes a first variable capacitor C1 358 coupled to a second variable capacitor C2 360 as shown. In the example, the first variable capacitor C1 358 and the second variable capacitor C2 360 are coupled to be tuned to provide a capacitance ratio of the capacitive voltage divider 370 that matches a coupling ratio from the power supply (AVDD/HVDD/NVDD) to the bitline output 310 of the pixel cell in accordance with the teachings of the present invention.

In the depicted example, the power supply compensation circuit 340 further includes a PSRR_en switch 362 coupled between the delay circuit 368 and the capacitive voltage divider 370. In the example, the PSRR_en switch 362 is coupled to selectively enable the capacitive voltage divider 370 to receive the power supply signal 320 through the delay circuit 368. The example depicted in FIG. 3 also illustrates that the power supply compensation circuit 340 also includes a PSRR_enb switch 364 coupled between the capacitive voltage divider 370 and ground as shown. In the example, the PSRR_enb switch 364 is coupled to selectively discharge the capacitive voltage divider 370 as shown in accordance with the teachings of the present invention.

In one example, before each readout takes place during operation, the reference signal VREF 352 is selectively sampled through Samp_ref reference sampling switch 350 onto the non-inverting input of operational amplifier 342. After the reference signal VREF 352 is sampled, the Samp_ref reference sampling switch 350 is turned off. During the readout, power supply compensation circuit 332 tracks the behavior of bitline output 310 continuously with power supply signal 320, so that the ratio and the delay of the power supply ripple to the output bitline 310 matches the delay of the power supply ripple to reference ramp signal Vramp 334. Therefore, any power supply variation or ripple on the two separate paths will be canceled out at the input of the operational amplifier 366 of analog to digital converter 330. Capacitor C1 and C2 are used to tuned the ratio while resistor R is used to tune the delay to match the path from power supply (AVDD/HVDD/NVDD) to the bitline output 310.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A ramp generator for use in readout circuitry of an image sensor, comprising:
    an integrator circuit having a first input coupled to receive a ramp generator input reference signal, and a second input coupled to receive a constant input signal, wherein the integrator circuit is coupled to generate a reference ramp signal coupled to be received by an analog to digital converter; and
    a power supply compensation circuit coupled to generate the ramp generator input reference signal, wherein the power supply compensation circuit includes:
        a delay circuit including a variable resistor coupled to receive a power supply signal representative of a power supply coupled to supply power to a pixel cell of the image sensor, and a filter capacitor coupled to the variable resistor, wherein the variable resistor is coupled to be tuned to match a delay ripple from the power supply to a bitline output of the pixel cell with a delay ripple from the power supply signal to the ramp generator input reference signal; and
        a capacitive voltage divider coupled to the delay circuit to generate the ramp generator input reference signal, wherein the capacitive voltage divider includes a first variable capacitor coupled to a second variable capacitor, wherein the first variable capacitor and the second variable capacitor are coupled to be tuned to provide a capacitance ratio of the capacitive voltage divider that matches a coupling ratio from the power supply to the bitline output the pixel cell.

2. The ramp generator of claim 1, wherein the power supply compensation circuit further includes:
    a first switch coupled between the delay circuit and the capacitive voltage divider, wherein the first switch is coupled to selectively enable the capacitive voltage divider to receive the power supply signal through the delay circuit; and
    a second switch coupled to the capacitive voltage divider, wherein the second switch is coupled to selectively discharge the capacitive voltage divider.

3. The ramp generator of claim 1 wherein the integrator circuit comprises:
    an operational amplifier including a first input coupled to receive the ramp generator input reference signal from the capacitive voltage divider, wherein a second input of the operational amplifier is capacitively coupled to an output of operational amplifier is further coupled to receive the constant input signal, wherein the output of the operational amplifier is coupled to generate the reference ramp signal coupled to be received by the analog to digital converter; and
    an equalizing switch coupled between the second input and the output of the operational amplifier, wherein the equalizing switch is adapted to be ON to equalize the second input and the output of the operational amplifier.

4. The ramp generator of claim 3 wherein the first input of the operational amplifier is further coupled to selectively sample a reference voltage through a reference sampling switch.

5. The ramp generator of claim 3 wherein the constant input signal is coupled to be received from a constant current source.

6. An imaging system, comprising:
    a pixel array including a plurality of pixel cells organized into a plurality of rows and columns for capturing image data;
    control circuitry coupled to the pixel array to control operation of the pixel array; and
    readout circuitry coupled to the pixel array to readout the image data from the pixel cells, the readout circuitry including:
        a sense amplifier circuit coupled to a bitline coupled to one of the plurality of columns of the pixel array to sample image data;
        an analog to digital converter coupled to the sense amplifier circuit to convert the image data sensed by the sense amplifier circuit; and
        a ramp generator coupled to generate a reference ramp signal coupled to be received by the analog to digital converter, the ramp generator including:
            an integrator circuit having a first input coupled to receive a ramp generator input reference signal, and a second input coupled to receive a constant input signal, wherein the integrator circuit is coupled to generate the reference ramp signal coupled to be received by the analog to digital converter; and
            a power supply compensation circuit coupled to generate the ramp generator input reference signal, wherein the power supply compensation circuit includes:
                a delay circuit including a variable resistor coupled to receive a power supply signal representative of a power supply coupled to supply power to the plurality of pixel cells of the pixel array, and a filter capacitor coupled to the variable resistor, wherein the variable resistor is coupled to be tuned to match a delay ripple from the power supply to a bitline output of the pixel array with a delay ripple from the power supply signal to the ramp generator input reference signal; and a capacitive voltage divider coupled to the delay circuit to generate the ramp generator input reference signal, wherein the capacitive voltage divider includes a first variable capacitor coupled to a second variable capacitor, wherein the first variable capacitor and the second variable capacitor are coupled to be tuned to provide a capacitance ratio of the capacitive voltage divider that matches a coupling ratio from the power supply to the bitline output the pixel array.

7. The imaging system of claim 6 further comprising function logic coupled to the readout circuitry to store the image data readout from the plurality of pixel cells.

8. The imaging system of claim 6, wherein the power supply compensation circuit further includes:

a first switch coupled between the delay circuit and the capacitive voltage divider, wherein the first switch is coupled to selectively enable the capacitive voltage divider to receive the power supply signal through the delay circuit; and a second switch coupled to the capacitive voltage divider, wherein the second switch is coupled to selectively discharge the capacitive voltage divider.

9. The imaging system of claim 6 wherein the integrator circuit comprises:

a first operational amplifier including a first input coupled to receive the ramp generator input reference signal from the capacitive voltage divider, wherein a second input of the first operational amplifier is capacitively coupled to an output of the first operational amplifier is further coupled to receive the constant input signal, wherein the output of the first operational amplifier is coupled to generate the reference ramp signal coupled to be received by the analog to digital converter; and an equalizing switch coupled between the second input and the output of the first operational amplifier, wherein the equalizing switch is adapted to be ON to equalize the second input and the output of the first operational amplifier.

10. The imaging system of claim 9 wherein the first input of the first operational amplifier is further coupled to selectively sample a reference voltage through a reference sampling switch.

11. The imaging system of claim 9 wherein the constant input signal is coupled to be received from a constant current source.

12. The imaging system of claim 6 wherein the analog to digital converter includes a second operational amplifier having a first input capacitively coupled to receive the image data sensed by the sense amplifier circuit, wherein the second operational amplifier has a second input capacitively coupled to receive the reference ramp signal from the ramp generator.

13. The imaging system of claim 12 wherein the analog to digital converter further includes a first reset switch coupled to the first input of the second operational amplifier, and a second reset switch coupled to the second input of the second operational amplifier, wherein the first and second reset switches are coupled to selectively reset the first and second inputs of the second operational amplifier.

* * * * *